United States Patent [19]

Ikebe et al.

[11] Patent Number: 4,747,007
[45] Date of Patent: May 24, 1988

[54] SPRING MEANS FOR BIASING A TAPE AGAINST A HEAD INSERTED IN A CASSETTE

[75] Inventors: Masaru Ikebe; Kimio Tanaka; Takateru Satoh; Haruo Shiba, all of Nagano, Japan

[73] Assignee: TDK Corporation, Japan

[21] Appl. No.: 775,526

[22] Filed: Sep. 13, 1985

[30] Foreign Application Priority Data

Sep. 17, 1984 [JP] Japan .................. 59-140741[U]

[51] Int. Cl.$^4$ .................. G11B 23/02; G11B 15/60
[52] U.S. Cl. .................. 360/132; 360/130.33; 360/130.31; 242/199
[58] Field of Search ....... 360/90, 130.2, 130.3–130.33, 360/137; 242/197–199

[56] References Cited

U.S. PATENT DOCUMENTS

| 3,749,852 | 7/1973 | Moriya et al. | 179/100.2 MD |
| 4,087,845 | 5/1978 | Saito | 360/132 |
| 4,271,441 | 6/1981 | Greiner et al. | 360/132 |
| 4,314,299 | 2/1982 | Ishida et al. | 360/130.33 X |
| 4,330,802 | 5/1982 | Kato et al. | 360/96.6 X |
| 4,544,925 | 10/1985 | Oishi et al. | 242/199 |

FOREIGN PATENT DOCUMENTS

| 55-132561 | 10/1980 | Japan | 360/132 |
| 1152031 | 4/1985 | U.S.S.R. | 360/130.33 |

*Primary Examiner*—John H. Wolff
*Assistant Examiner*—Alfonso Garcia
*Attorney, Agent, or Firm*—Steinberg & Raskin

[57] ABSTRACT

A tape cassette has a housing and a pressure pad apparatus mounted within the housing for bringing a magnetic tape into direct contact with a magnetic head. The pressure pad apparatus includes a pad, a spring joined to the pad for imparting a pushing force to the magnetic head, and a holding member mounted within the housing for holding the spring at two points spaced from each other. The effective length of the spring is greater than the distance between the two holding points of the holding member.

5 Claims, 3 Drawing Sheets

SPRING MEANS FOR BIASING A TAPE AGAINST A HEAD INSERTED IN A CASSETTE

BACKGROUND OF THE INVENTION

The present invention relates to a tape cassette More particularly, the invention relates to a pressure pad apparatus or unit for bringing a magnetic tape provided within the housing of a tape cassette into direct contact with a magnetic head.

In general, a tape cassette, such as, for example, an audio tape cassette, is provided with a pressure pad apparatus to improve the contact state of the magnetic tape with the magnetic head and, thus, to minimize the space loss. A tape cassette of this type is advantageous since it requires only a small back tension, because the pressure pad pushes the magnetic tape directly against the magnetic head surface. Furthermore, the structure of the tape cassette may be simplified.

SUMMARY OF THE INVENTION

An object of the invention is to provide a tape cassette having a pressure pad apparatus which is deformed by the pushing force of a magnetic head.

Another object of the invention is to provide a tape cassette having a minimized amount of change in the pad pressure applied by the magnetic head relative to the amount of deformation of the spring included in the pressure pad apparatus.

Still another object of the invention is to provide a tape cassette having a decreased space loss between the magnetic tape and the magnetic head thereby resulting in small frequency characteristic variation caused by the type of driving apparatus used.

In accordance with the invention, a tape cassette comprises a housing and a pressure pad apparatus mounted within the housing for bringing a magnetic tape into direct contact with a magnetic head. The pressure pad apparatus includes a pad, a spring joined to the pad for imparting a pushing force to the magnetic head, and a holding member mounted in the housing for holding the spring at two points, spaced a predetermined distance from each other. The effective length of the spring is greater than the distance between the two holding points of the holding member.

The spring comprises a central portion joined to the pad, winding portions positioned to have the central portion interposed therebetween, and side portions positioned to have the central portion and the winding portions interposed therebetween. Each of the side portions is partly bent toward the holding member, so as to form a bending section which is brought into contact with the holding member during operation of the tape cassette.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
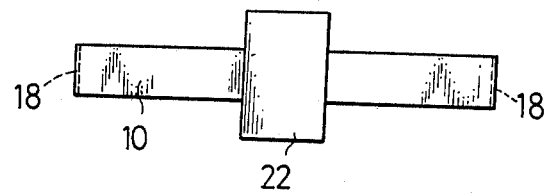
FIG. 1 is a plan view showing the principal portion of a pressure pad apparatus of the prior art included in a conventional tape cassette.
Figure 2:
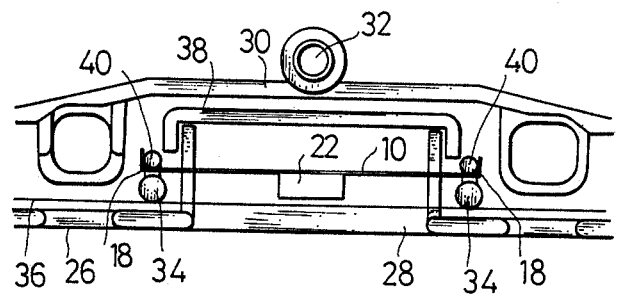
FIG. 2 is a top view showing the principal portion of a tape cassette having a conventional pressure pad apparatus.

FIG. 1 is a plan view of the principal portion of a pressure pad apparatus of the prior art. As seen in FIG. 1, the pressure pad apparatus comprises a slender leaf spring 10 formed of a metal such as phosphorized copper and a pad 22 adhered to the central portion of the spring 10. The pad 22 is a rectangular felt chip, for example. FIG. 2 is a top view showing that the pad 22 adhered to the spring 10 is provided within the housing of a tape cassette. As seen in FIG. 2, the end portions of the spring 10 are rearwardly bent at substantially right angles to provide bent portions 18, 18. The housing consists of a lower half 26 and an upper half (not shown in the FIGS.). The lower half 26 is provided with a central opening 28 in the front central portion. As described hereinafter, a magnetic tape is inserted in the housing through the central opening 28.

The central opening 28 is separated from the inner space of the housing by a partition wall 30. Furthermore, the lower half 26 of the housing is joined to the upper half of said housing by a threaded projection 32. It is seen that a pair of guide pins 34, 34 are provided somewhat rearward of the central opening 28 to guide a magnetic tape 36. The tape 36 extends along the inlet portion of the central opening 28 in direct contact with the surfaces of the guide pins 34, 34. A shielding plate 38 for shielding the magnetism is disposed deep inside the housing at the central opening 28. Holding members 40, 40, serving to hold the spring 10, project upward directly from the lower half 26 of the housing and are positioned behind the guide pins 34, 34. It follows that the holding members 40, 40 and the guide pins 34, 34 are positioned near the bent portions 18, 18 of the spring 10, so as to hold the pad 22 at the proper position. The holding members 40, 40 may be directly mounted on the shielding plate 38, instead of the lower half 26 of the housing.

Figure 3:
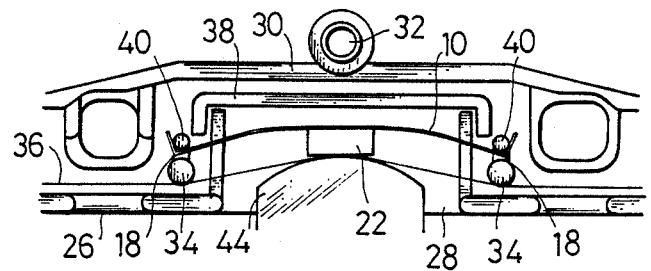
FIG. 3 is a top view showing the magnetic head of the driving apparatus inserted in the known tape cassette of FIG. 2.

When the tape cassette provided with the pressure pad apparatus of the aforedescribed structure is inserted in a driving apparatus for recording audio signals, or reproducing the recorded signals, a magnetic head 44 of the driving apparatus is inserted in the housing through the central opening 28, as shown in FIG. 3. As a result, the pad 22 and the spring 10 are pushed together with the magnetic tape 36 by the magnetic head 44 of the driving apparatus, so as to cause said spring to be elastically deformed rearward. It follows that the restoring force of the spring 10 generated by the elastic deformation of said spring causes the pad 22 to push the magnetic tape 36 against the magnetic head 44. Incidentally, the magnetic head 44 is spaced from the magnetic tape 36 during the rapid winding operation and non-use of the tape cassette.

Figure 4:
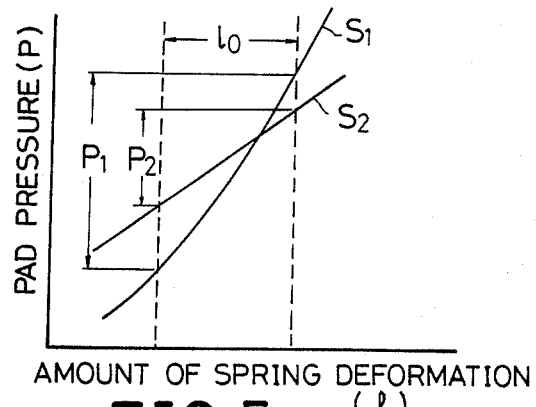
FIG. 4 is a graphical presentation showing the relationship between the amount of deformation of the spring included in the pressure pad apparatus and the pad pressure.

FIG. 4 shows characteristic curves each denoting the relationship between the spring deformation amount l of the pressure pad apparatus and the pad pressure P applied to the magnetic head on the basis of said spring deformation amount. Curve $S_1$, shown in FIG. 4, represents the prior art and curve $S_2$ represents the invention, as hereinafter described. The effective length of the spring, which is a constituent of the pressure pad apparatus, is determined primarily by the distance between the spring-holding points of the holding members 40, 40. As apparent from curve $S_1$ of FIG. 4, a change $l_o$ in the spring deformation amount l causes a change $P_1$ in the pad pressure P. The pad pressure P of even the same tape cassette differs, depending upon the type of driving apparatus in which the tape cassette is set. The non-uniformity of the pad pressure P is required to fall within the rated permissible range. However, if the change in the pad pressure relative to the change in the spring deformation amount is noticeably large within the rated permissible range, the pressure of the magnetic tape applied to the magnetic head is rendered unstable, with the result that a space loss tends to occur readily. This results in the frequency characteristics failing to become stabilized. The frequency characteristics vary in dependence upon the driving apparatus used.

Figure 5:
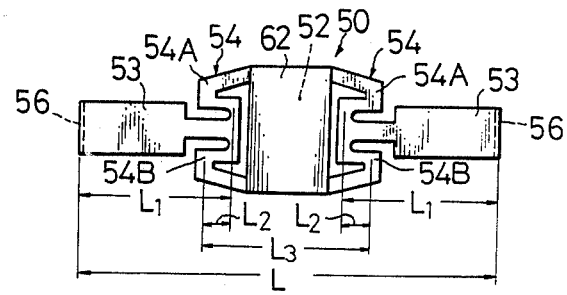
FIG. 5 is a plan view showing the principal portion of an embodiment of the pressure pad apparatus of the invention.
Figure 6:
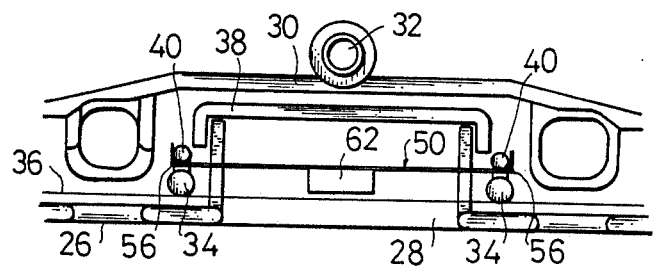
FIG. 6 is a top view showing the state of the embodiment of FIG. 5 before operation of the principal portion of the tape cassette.
Figure 7:
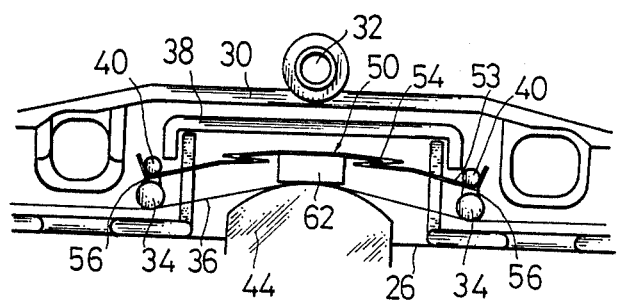
FIG. 7 is the top view of FIG. 6 with a magnetic head inserted in the tape cassette.

FIGS. 5 to 7 collectively show the tape cassette of one embodiment of the invention. In the FIGS., the same components are identified by the same reference numerals.

A spring 50 in FIG. 5 is formed of a phosphorized copper thin plate. The spring 50, which constitutes part of the pressure pad apparatus, comprises an oblong central portion 52 substantially equal in shape to the pad hereinafter described, winding portions 54, 54 positioned with said central portion interposed therebetween, and oblong side portions 53, 53 positioned with said central portion and said winding portions interposed therebetween. The winding portions 54, 54 are symmetrical with each other with respect to the central portion 52. Sections 54A and 54B are formed in each of the winding portions. Each of the sections 54A and 54B is bent substantially 180° at two points. A pad 62 consisting of a rectangular felt chip is adhered to the central portion 52 of the spring 50.

FIG. 6 shows that the tips of the side portions 53 are bent at substantially right angles toward the holding members 40, 40 serving to hold the spring 50, thereby forming bending sections 56, 56. Guide pins 34, 34, shown in FIG. 6, guide the magnetic tape. In other words, each of the bending sections 56, 56 of the spring 50 is interposed between a corresponding one of the holding members 40, 40 and a corresponding one of the guide pins 34, 34. When the tape cassette of the invention provided with the pressure pad apparatus of the aforedescribed structure is inserted in a driving apparatus for recording audio signals, or reproducing the recorded signals, the magnetic head 44 of the driving apparatus pushes the pad 62 and the spring 50 together with the magnetic tape. As a result, the spring 50 is deformed, as shown in FIG. 7.

In the aforedescribed embodiment, the effective length $L_o$ of the spring 50 is far greater than the length L between the bending sections 56, 56 of said spring, that is, the distance between the holding members 40, 40, as seen from FIG. 5.

The aforementioned distance L is:

$$L = 2L_1 - 2L_2 + L_3 \quad (1)$$

wherein $L_1$ is the distance between the bending section 56 and that side of the winding portion 54 which faces the central portion 52 of the spring 50, $L_2$ is the distance between the two bent portions of the winding portion 54, and $L_3$ is a distance substantially equal to the distance obtained by subtracting the sum of the lengths of the two side portions 53, 53 from the length L given above.

On the other hand, the effective length $L_o$ of the spring 50 is:

$$L_o = 2L_1 + 2L_2 + L_3 \quad (2)$$

Thus $$L_o - L = 4L_2 \quad (3)$$

As seen from Equation (3), the effective length $L_o$ of the spring 50 is greater than the length L between the spring-holding points of the holding members 40, 40 by four times the distance $L_2$ as hereinbefore defined. The large effective length $L_o$ of the spring 50 hereinbefore mentioned produces a prominent effect, as seen from curve $S_2$ of FIG. 4. Specifically, the change $P_2$ in the pad pressure caused by the change $l_o$ in the spring deformation amount is considerably smaller than the change $P_1$ of the prior art denoted by the curve $S_1$ of FIG. 4. In conclusion, the spring 50 has an effective length greater than the distance between the two spring-holding points of the holding members 40, 40, with the result that the invention makes it possible to diminish the change in the pad pressure applied to the magnetic head relative to the amount of change in the spring deformation. It follows that the contact of the magnetic head with the magnetic tape is stabilized, and the space loss is diminished. Naturally, the invention permits diminishing the change in the frequency characteristics caused by the type of the driving apparatus used.

Figure 8:
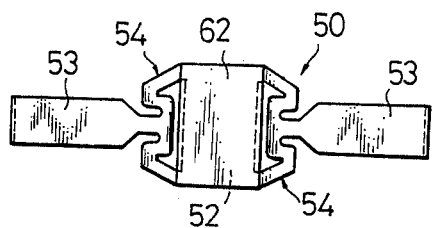
FIGS. 8, 9 10 are plan views showing the principal portions of second, third and fourth embodiments of the pressure pad apparatus of the invention.
Figure 9:
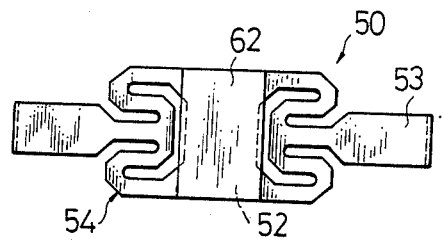
Figure 10:
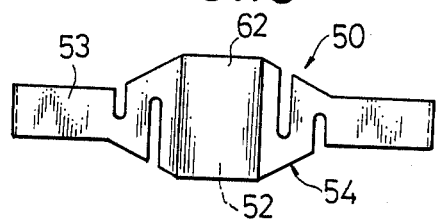

FIGS. 8, 9 and 10 show other embodiments of the invention. In each of the embodiments of FIGS. 8, 9 and 10, the spring 50 included in the pressure pad apparatus comprises the central portion 52, the winding portions 54, 54, and the side portions 53, 53. Of course, the effective length of the spring 50 is greater in the embodiments of FIGS. 8, 9 and 10 than the distance between the two spring-holding points of the holding members of the spring 50, as in the first embodiments, shown in FIG. 5. However, the embodiments of FIGS. 8 to 10 differ somewhat from the embodiment of FIG. 5 primarily in the length and shape of the winding portion of the spring.

thus, the present invention is directed to spring means 50 for biasing a tape 36 against a head 44 inserted in a cassette, comprising a spring 50 having a substantially central portion 52, a pair of side portions 53, 53 extending away from the central portion 52, and a pair of winding portions 54, 54. Each winding portion 54 connects the central portion 52 with a respective side portion 53. The winding portions 54, 54 extend towards one another from the central portion 52 to the respective side portions 53 (FIG. 7).

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Spring means for biasing a tape against a head inserted in a cassette, said spring means comprising
   a spring having
   a central portion having a length and a width,
   two intermediate portions, connected to opposite sides of said central portion in the length direction thereof,
   each said intermediate portion comprising
   a first pair of arms, with each said arm of said first pair connected to said central portion and extending away from said central portion in the length direction thereof,
   a second pair of arms, each arm of said second pair connected to a respective arm of said first pair and extending toward said central portion from the connection with said arm of said first pair, such that each said intermediate portion is bent by about 180° in the length direction at connection of said arm of said first pair with said arm of said second pair, and
   a connecting member connecting ends of said arms of said second pair which are opposite the connections with said arms of said first pair, each said connecting member extending in the width direction of said central portion, and said arms of said second pair being situated inwardly of said arms of said first pair of each said intermediate section, in the width direction, and
   a pair of side portions, each said side end portion connected to a respective connecting member of a respective intermediate portion between connection of said arms of said second pair, and extending away from said central portion in the length direction thereof, said side end portions each being formed to be seated in or about a holder in the cassette,
   wherein an effective length $L_0$ of said spring when the tape is biased is equal to a sum of distances in the length direction of said central portion, as follows:
   distance, $L_3$, between connection of said first and second pairs of arms of opposite intermediate portions,
   twice a distance $L_2$ between the connection of said arms of said first and second arm pairs, and connection of said connecting member to said arms of said second pair ($2L_2$), and
   twice a distance $L_1$ of said end portion from connection with said respective connecting member to an edge of said respective end portion adapted to seat in or about a respective holder ($2L_1$), and
   said effective length $L_0$ is greater than unbiasing length $L$ of said spring or straight distance between the respective holders, by about four times said distance $L_2$, or $4L_2$.
   whereby change in pressure applied to said spring means is minimized relative to amount of deformation of said spring.

2. The spring means of claim 1, wherein said central portion thereof biases the tape when the head is inserted in the cassette.

3. The spring means of claim 1, wherein each of said side portions additionally comprises a bent end at said edge thereof and formed to be seated in or about the respective holder.

4. The spring means of claim 2, additionally comprising a pad adhering to said central portion of said spring and disposed to contact the tape when the head is inserted in the cassette.

5. The spring means of claim 3, wherein said bent ends of said side portions are each positionable between a guide pin for the tape and the respective holder.

* * * * *